United States Patent [19]

Stevenson

[11] 4,440,338

[45] Apr. 3, 1984

[54] FRICTION WELDING MACHINE

[75] Inventor: Christopher T. S. Stevenson, New Britain, Conn.

[73] Assignee: Litton Industrial Products, Inc., New Britain, Conn.

[21] Appl. No.: 329,248

[22] Filed: Dec. 10, 1981

[51] Int. Cl.[3] .............................................. B02C 31/00
[52] U.S. Cl. ........................................ 228/2; 228/13
[58] Field of Search ......................... 228/2, 125, 13; 219/101–104

[56] References Cited

U.S. PATENT DOCUMENTS

| | | | |
|---|---|---|---|
| 3,352,995 | 11/1967 | Lesley | 228/125 |
| 3,749,298 | 7/1973 | Hasui | 228/2 |
| 4,043,497 | 8/1977 | Jones | 228/2 |

Primary Examiner—Kenneth J. Ramsey
Assistant Examiner—M. Jordan
Attorney, Agent, or Firm—Brian L. Ribando

[57] ABSTRACT

A friction welding machine for welding first and second tubular workpieces together comprises a workhead assembly having a rotatable chuck for forcefully displacing the first workpiece into frictional engagement with the second workpiece. The workhead includes a shear mechanism having a shear tool mounted for selected displacement along the chuck's rotational axis. A shear cylinder of the shear mechanism positions the shear tool at a selected ready position within the first tubular workpiece preparatory to a welding operation, advances the shear tool upon completion of the welding operation into the second tubular workpiece thereby shearing the freshly formed internal weld flash, and retracts the shear tool to a remote position after shearing.

2 Claims, 4 Drawing Figures

Fig_1

Fig_2

FRICTION WELDING MACHINE

The present invention relates to friction welding machines for welding tubular workpieces together.

A friction welding machine rapidly rotates a first workpiece and laterally displaces it into forceful engagement with a second axially related workpiece. The resulting friction heats the area of contact into a weldable mass. Upon cessation of relative displacement, the resulting weld joints the two workpieces.

When two tubular workpieces are welded together in this manner, a bead or flash is formed around the interior of the weld joint. This internally projecting flash must be removed to provide a smooth bore through the weldment. Conventionally, the weldment is taken from the friction welder to a shear station whereat a shear tool is driven through the weldment. It has been discovered that in order to prevent excessive wear to the shear tool and to effect a smooth finish on the interior of the weld joint, the flash should be sheared while it is hot. However, the time required to transport the weldment to the separate shear station allows the weld joint to cool.

It is accordingly an object of the present invention to provide an improved friction welding machine which includes an internal shear mechanism for removing the internal weld flash formed between two tubular workpieces.

Other objects and advantages of the present invention will become apparent from the following portion of the specification and from the accompanying drawings which illustrate, in accordance with the mandate of the patent statutes, a presently preferred embodiment incorporating the principles of the invention.

Referring to the drawings.

Figure 1:
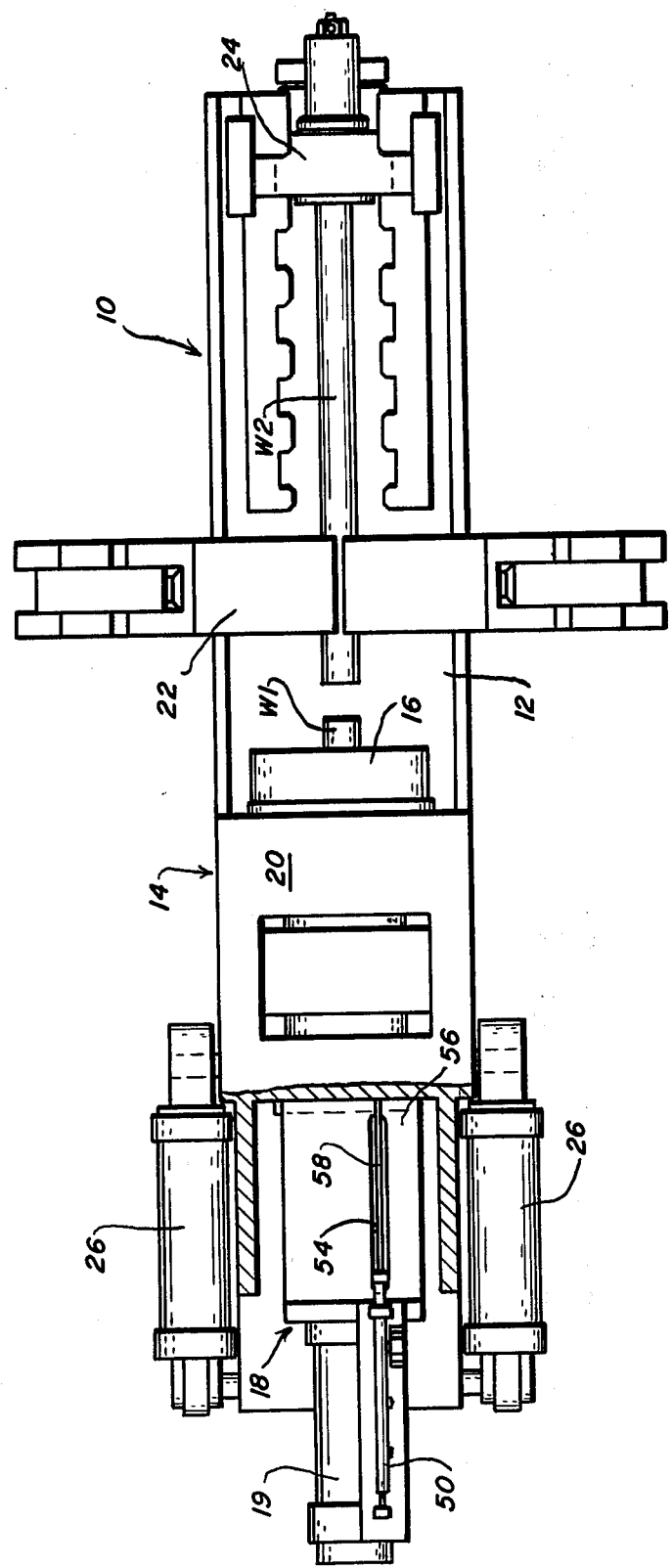
FIG. 1 is a top view partially sectioned of a friction welding machine.

As shown in FIG. 1, the friction welding machine 10 comprises a base 12 and a laterally displaceable workhead assembly 14. The workhead assembly 14 includes a rotatable cylindrical chuck 16 and a shear control mechanism 18 having a hydraulic shear cylinder 19 aligned with the axis of the cylindrical chuck 16 and secured to the rear of a workhead housing 20. A first tubular workpiece W1 is gripped by the workhead chuck 16 in axial alignment with a second tubular workpiece W2 which is secured in a stationary position by a clamp 22 and an end stop assembly 24. A pair of hydraulic forge cylinders 26 operatively associated with the workhead 14 axially displace the first workpiece W1 as it is rotated by the chuck 16 into frictional engagement with the second workpiece W2 to thereby weld the two workpieces together.

Figure 2:
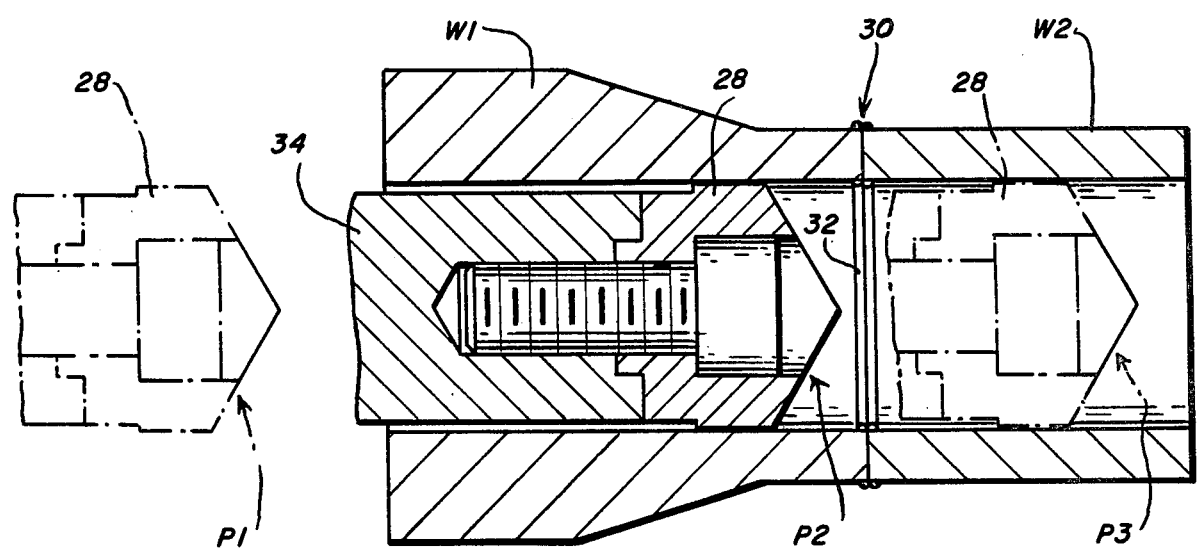
FIG. 2 is a side sectional view of the shear tool of the friction welding machine positioned within the workpiece.

The shear control mechanism 18 advances a shear tool 28, shown in FIG. 2, from a remote position P1 to a ready position P2 within the first workpiece W1 prior to engagement of the workpieces. During the welding operation, the first workpiece W1 rotates about the shear tool 28 which is maintained in a ready position P2. Immediately upon completion of the weld, the tool 28 is driven through the weld joint 30 into the second workpiece W2 to position P3 thereby shearing the freshly formed flash 32 while it is still heated from the friction welding operation.

After the flash has been sheared, the shear tool 28 is retracted from the weldment and returned to the remote position P1. During the shearing operation, hydraulic fluid pressure in the shear cylinder 19 and the forge cylinders 26 is controlled such that the shear force does not exceed the forge force on the weld joint 30.

Figure 3:
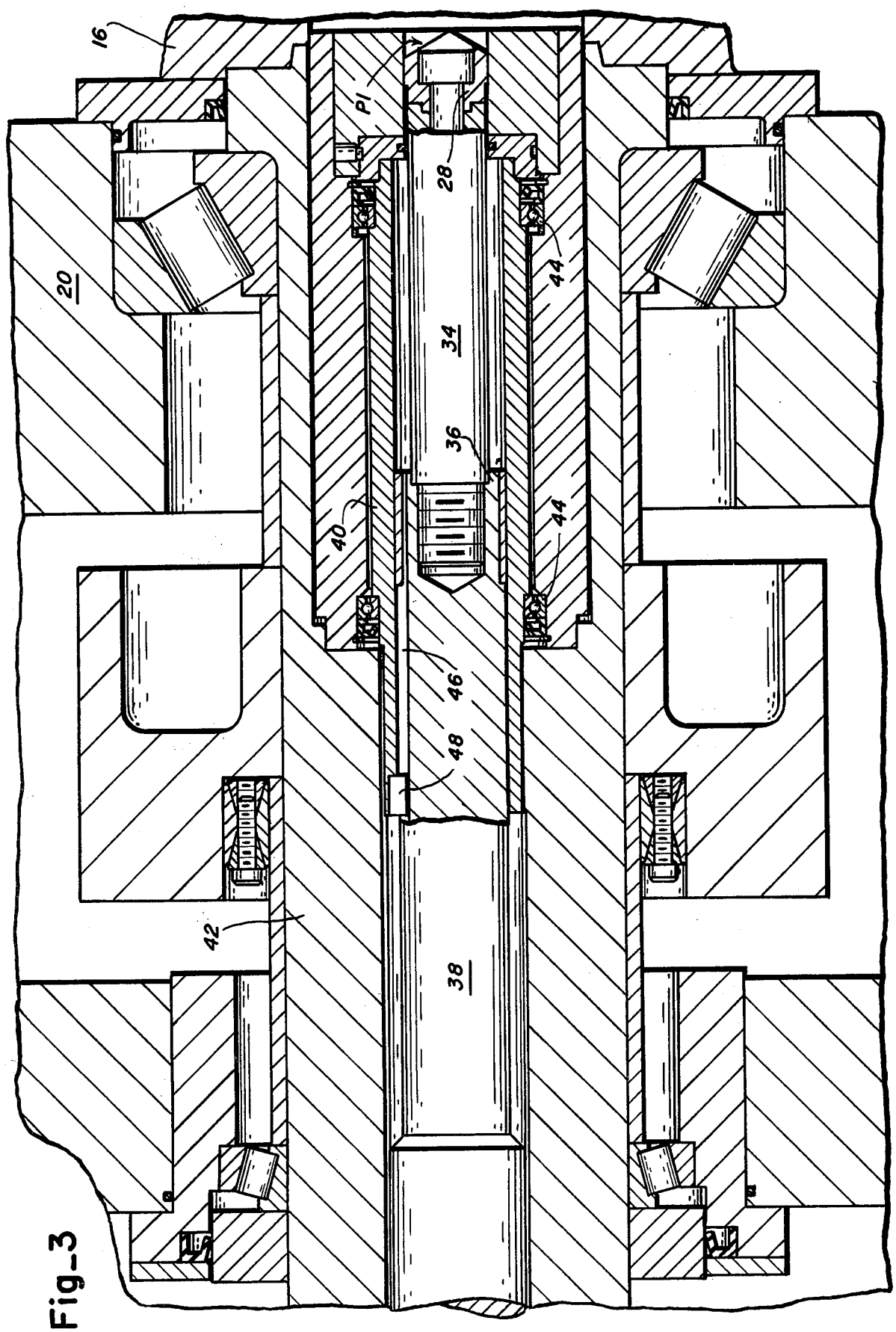
FIG. 3 is a side sectional view of the workhead spindle of the friction welding machine shown in FIG. 1.

As can be seen in FIG. 3, a shear bar 34 to which the shear tool 28 is mounted is threadedly received within the end 36 of the elongated piston 38 of the hydraulic shear cylinder. A sleeve 40 supports the shear bar 34 and the piston 38 within a hollow workhead spindle 42 which is driven by a motor (not shown) to rotate the chuck 16. The sleeve 40 is mounted in the spindle 42 by a pair of bearings 44 and is keyed to a keyway 46 in the piston 38 by a key 48 so that the sleeve 40 remains stationary as the spindle 42 rotates.

Figure 4:
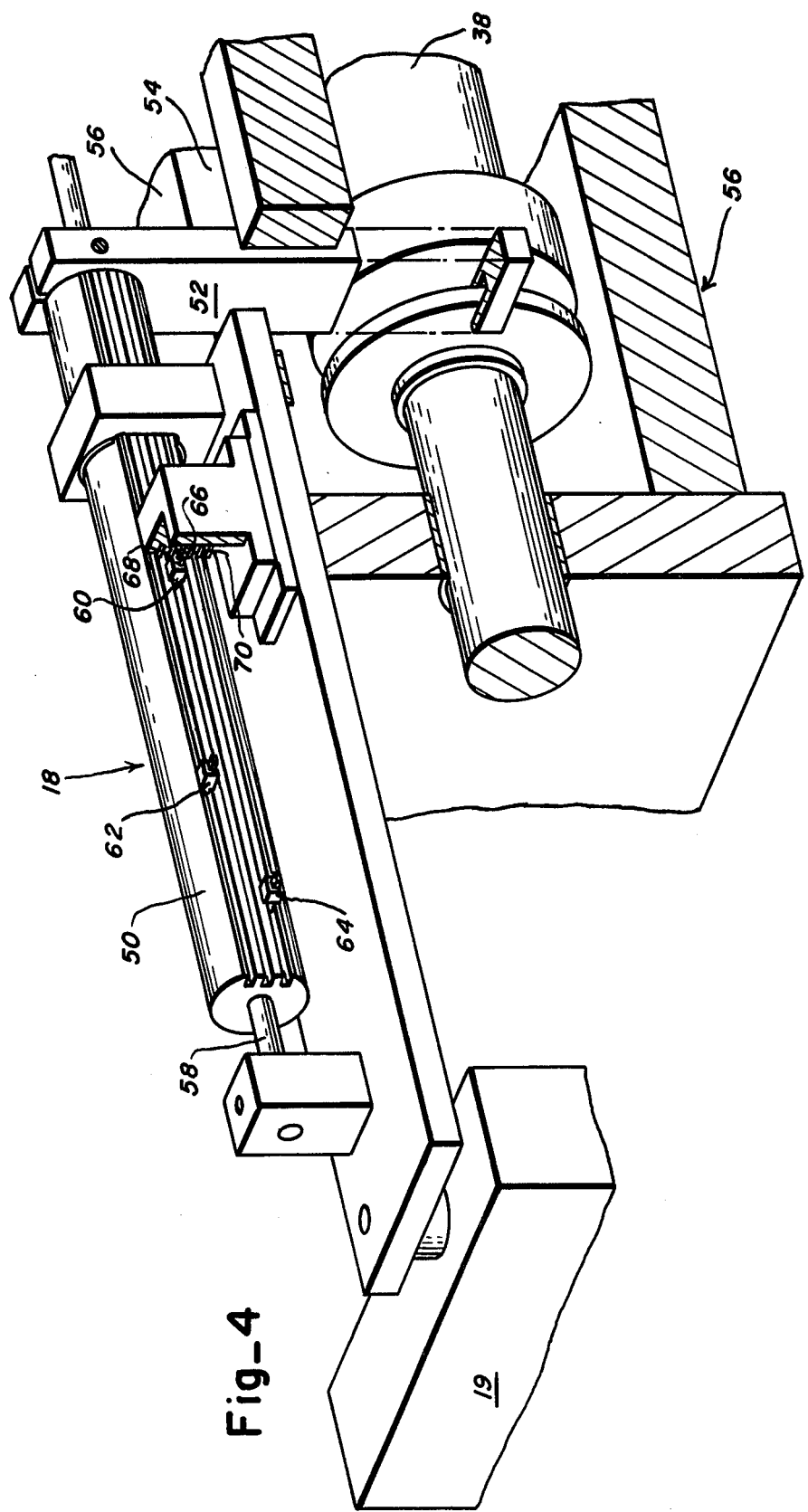
FIG. 4 is a partial perspective view of the shear mechanism of the friction welding machine.

As can be seen in FIG. 4, the shear control mechanism 18 comprises a program bar 50 which is coupled to the piston 38 of the shear cylinder 19 by a connecting actuator bar 52. A slot 54 in the shear cylinder support bracket 56 permits the connecting bar 52, and, accordingly, the program bar 50, to track axial motion of the piston 38. The program bar 50 is supported on a horizontal guide rod 58 and has three adjustable cams or dogs 60, 62, 64 which engage with stationary switches 66, 68, 70 to respectively define the remote, ready and advanced positions P1, P2, P3 of the shear tool 28. The intermediate dog 62 is preferably adjusted to define the ready position P2 of the shear tool 28 within the first workpiece W1 at a location approximately two inches recessed from the weld area to minimize travel time required by the shear tool 28 to reach the weld area. It will be appreciated that should a weld occur between the shear tool 28 and the rotating workpiece W1, the shear bar 34 will begin to rotate. Since the piston 38 cannot rotate, this will cause the shear bar 34 to unscrew from the piston 38 which will displace the piston 38 rearwardly thereby moving the intermediate dog 62 off of its respective switch 68 to interrupt the welding operation.

In the preferred embodiment, the shear tool is made of high speed steel to better withstand the high temperatures generated during welding and is configured such that the flash is sheared into two pieces to facilitate its removal from the weldment.

Having thus described the invention, various modifications and alterations thereof will occur to those skilled in the art, which modifications and alterations are intended to be included within the scope of the appended claims.

What is claimed is:

1. In a friction welding machine having a horizontally displaceable workhead assembly including a rotatable chuck for gripping and rotating a first tubular workpiece about its axis and a means for securing a secured tubular workpiece in a stationary position axially aligned opposite one end of the first workpiece gripped by said chuck, an integral shear for shearing internal weld flash formed by the friction welding operation, the integral shear comprising:

a shear tool mounted on the end of a shear bar, a shear cylinder and piston for displacing the shear bar and shear tool along the axis of the rotatable chuck, a slideably mounted program bar, means for coupling the program bar to the shear piston whereby axial movement of the shear piston is followed by the program bar, first, second, and third adjustable cams mounted on the program bar and defining remote, ready, and advanced positions of the shear tool with respect to said tubular workpieces, and first, second, and third switches engagable by the first, second, and third cams to define the location of the shear tool at remote, ready, and advanced positions, respectively, within said tubular workpieces, whereby during a friction welding cycle said shear tool may be advanced from a remote position within one of said workpieces, to a ready position adjacent the weld area of said two workpieces, then to an advanced position in the other of said workpieces past the weld area in order to shear internal weld flash, and thereafter back to said remote position.

2. The friction welding machine of claim 1 additionally comprising:

means for interrupting the welding operation upon the formation of a weld between the formation of a weld between the shear tool in the ready position and the rotating workpiece, said means for interrupting comprising a threaded connection between the shear bar and the shear piston, whereby the formation of a weld between the shear tool in the ready position and the rotating workpiece causes the shear bar to rotate relative to the piston to unscrew and displace the piston, causing said program bar and second cam to be axially shifted relative to said second switch.

* * * * *